Oct. 22, 1946.  F. FISCHER ET AL  2,409,672
APPLIANCE FOR MEASURING THE VELOCITY OF PROJECTILES
Filed March 18, 1944  2 Sheets-Sheet 1
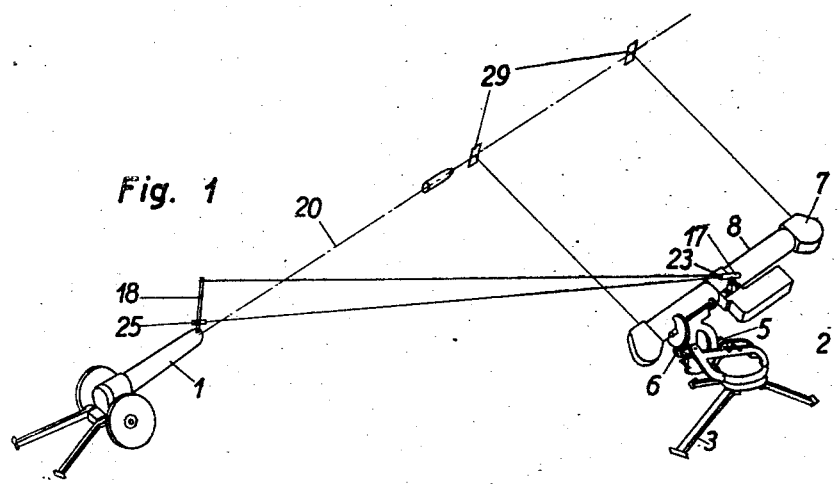
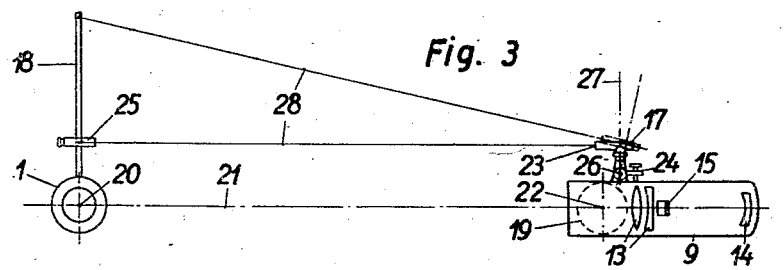
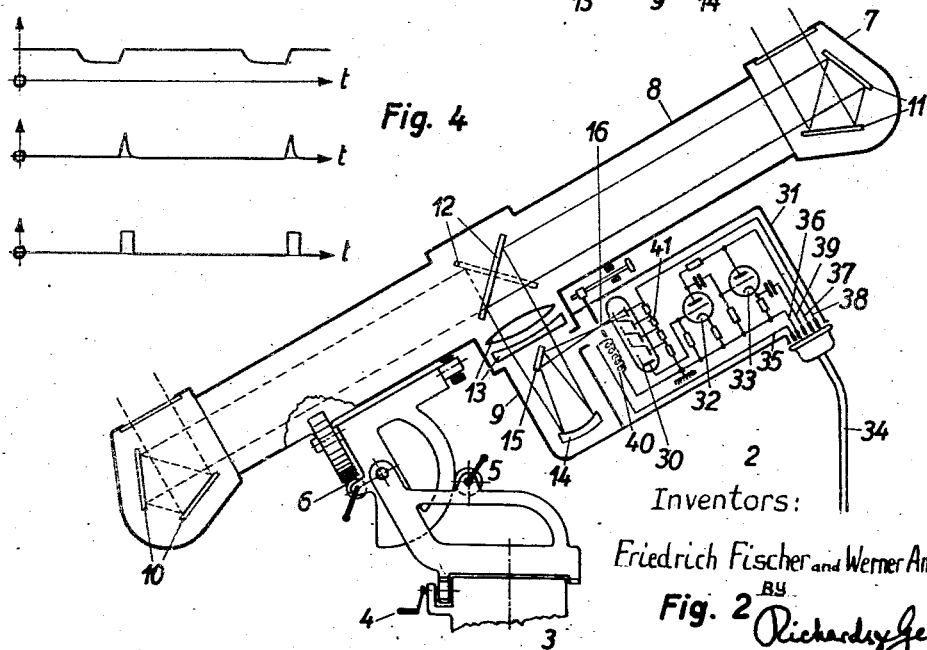
Inventors:
Friedrich Fischer and Werner Amrein
BY
Richards Geier
ATTORNEYS

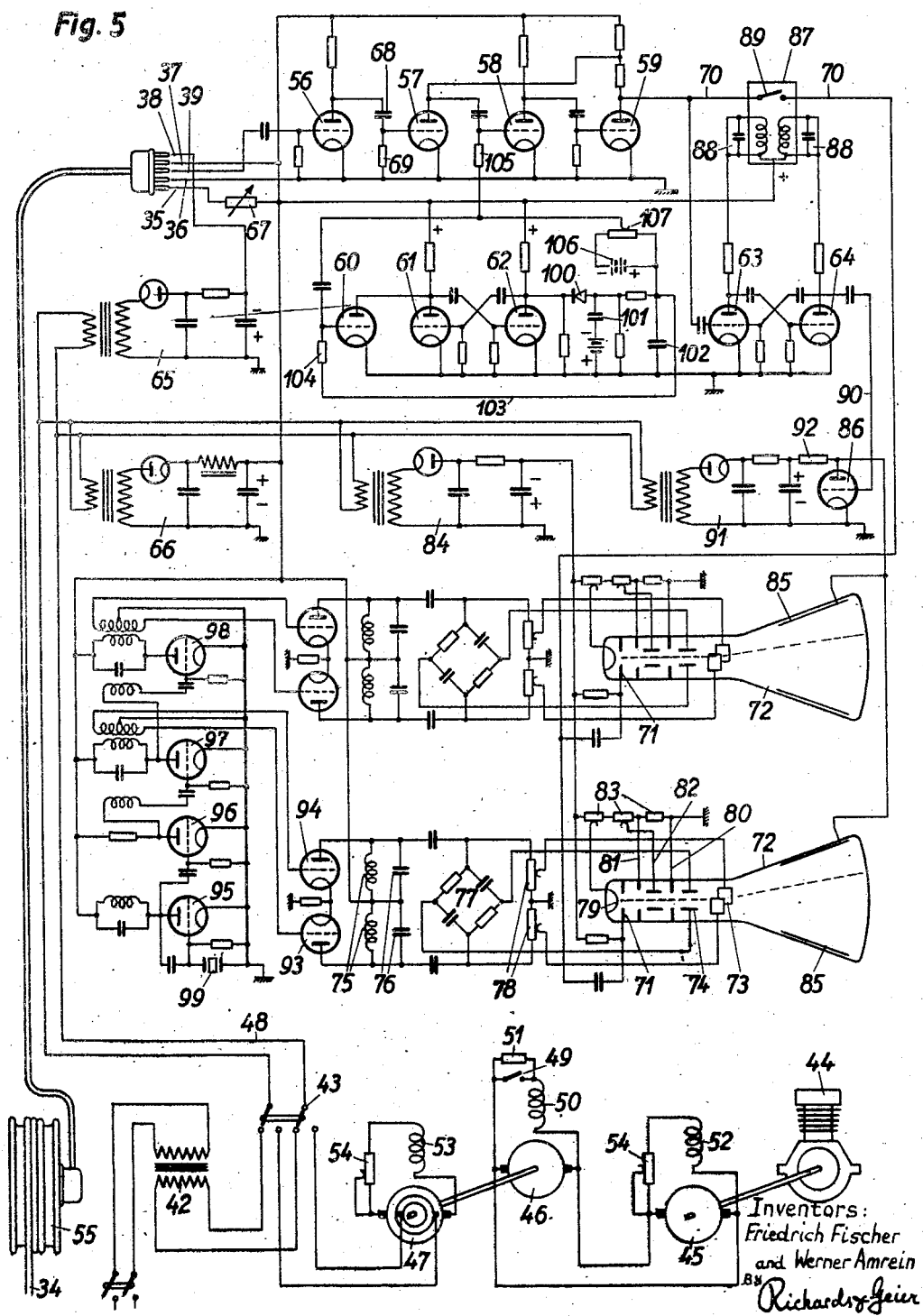

Patented Oct. 22, 1946

2,409,672

UNITED STATES PATENT OFFICE 2,409,672

APPLIANCE FOR MEASURING THE VELOCITY OF PROJECTILES

Friedrich Fischer, Zurich, and Werner Amrein, Rumlang, Switzerland

Application March 18, 1944, Serial No. 527,060
In Switzerland May 1, 1943

14 Claims. (Cl. 250—41.5)

The devices hitherto known for measuring the velocity of projectiles involve the drawback that the registering appliances, or at least part of these, must be located in the projectile trajectory. Examples are the known ballistic pendulum and the Boulengé apparatus. The newest electric methods in which the passage of the projectile through electric fields is measured also require definite parts of the appliances to be located in the projectile trajectory. It is obvious that hitherto, in order to be able to measure the projectile velocity at all, firing practice had to be specially arranged with a view to this purpose. As for accuracy of measurement, existing methods fall far short of perfection. The far reaching improvements which have in recent years taken place in ballistic investigation methods make it to-day necessary to arrive at a degree of measuring accuracy of the velocities of projectiles of one per thousand. On the other hand, the considerable increase in the velocities of projectiles prevailing in present-day artillery practice results in a rapid wearing-out of gun barrels, and consequently in a continuous reduction of the initial velocity of the projectiles. There is therefore an imperative need to be able to verify on guns set up under conditions corresponding to actual warfare the initial velocities of the projectiles within short time intervals by means of suitable appliances easy to move about, rapidly set up on any ground and designed for accurate measurement.

The aim was therefore to evolve an appliance by means of which it would be possible to measure the velocities of projectiles from definite distances without requiring part of the appliances to be placed within the projectile trajectory. An obvious possibility was to select optical instruments for this purpose. The available light intensities, however, are so insignificant that they could not be utilized by the existing methods.

Now, the present invention refers to a device enabling to measure velocities of projectiles by optical means. The device according to the present invention includes a registering apparatus containing a photo-electric cell with electronic multiplier, a slit arranged in front of this cell, an optical implement and systems of mirrors, for the purpose of depicting the slit in two spots of the projectiles trajectory lying at a definite distance from each other—furthermore a measuring appliance connected by cable with the registering apparatus and in which, in two cathode ray tubes at least, is made visible the time interval between the impulses generated by the passage of the projectile through the slit images. The registering apparatus may suitably include an appliance for measuring distances, and also a mechanism controlling displacement in direction and elevation and a wheeling in mechanism.

Figs. 1 to 5 show the whole device and particulars of its working. Fig. 1 shows the registering apparatus set up parallelly to the projectile trajectory and by the side of the gun. Fig. 2 is a section through the registering apparatus, leaving away the lower parts of the mounting. Fig. 3 is a section through the objective of the registering apparatus, perpendicular to the projectile trajectory, intended to convey a plainer idea of the distance measuring appliance of the registering apparatus. Fig. 4 is a representation of the current and voltage impulses arising in the electrical equipment in connection with the passage of the projectile through the slit images. Lastly, Fig. 5 shows the full switch system of the measuring appliance connected by cable with the registering apparatus and by means of which the time interval between the impulses just mentioned can be measured.

Aside, and in front of gun 1 is set up the registering apparatus 2. The registering apparatus 2 consists of a mounting 3 equipped with a machine 4 for swivelling (see Fig. 2) with a range of rotation from 0 to 360°, a machine 5 for pointing in elevation, with a range of rotation from 0 to 90°, and a wheeling in machine 6. Consequently, the casing 7 fitted on the mounting 3 and containing the registering mechanism is adjustable in direction, in elevation and round its axis. The casing 7 consists of the measuring base body 8, the objective 9, the combined photo-electric cell and electronic multiplier 30, and the input-amplifier 32 to 41. The measuring base body is equipped at its ends with pentagonal mirrors 10 and 11, and in the middle with two cross mirrors 12 inclined at 90° against each other. The objective includes a system of lenses 13, a hollow mirror 14, a plane mirror 15. In front of the photo-electric cell 30 is arranged a slit 16 adjustable in length and width and displaceable in the optical axis. In the middle of the measuring base body is arranged a distance measuring appliance 17 by means of which a distance measuring staff 18 set on the gun can be aimed at.

To make the matter quite clear, the working of the registering apparatus shall be explained in the first place.

According to the Fig. 1 the registering apparatus 2 is set up laterally in front of the gun, the interval being selected larger or smaller according to the bore of the gun. The measuring base body 8 is then set up parallelly to the trajectory, i. e. the barrel of the gun 1, according to the methods in general use in the artillery. With the help of the distance measuring appliance 17 and of the wheeling in machine 6, the measuring base body is then adjusted in such a manner that the optical plane is passing through the trajectory. The distance between the registering apparatus and the trajectory can be simultaneously ascertained by means of the distance measuring appliance 17.

The exact method of working of the distance measuring appliance, the correct handling of which is of primary importance for the perfect functioning of the whole equipment—shall be more fully described with the assistance of Fig. 3. Fig. 3 is a section, perpendicular to the projectile trajectory, through the objective 9 of the registering apparatus 2 with the lens system 13, the hollow mirror 14, the plane mirror 15 and the distance measuring appliance 17. The measuring base body 8 standing perpendicularly to the objective axis is indicated by the dotted circle 19. The two circles drawn round the projectile trajectory 20 standing perpendicularly to the drawing plane indicate the projection of the gun barrel 1. In order to ascertain the distance, the distance measuring staff 18 is now set up on the gun barrel, in doing which the condition must be complied with that this distance measuring staff 18 shall be perpendicular to the plane 21— indicated by a dash line formed by the gun barrel axis and the axis 22—standing perpendicularly to the drawing plane—of the measuring base body 8 (center of the dash circle 19). In order to comply with this requirement, the telescope 23 of the distance measuring appliance 17 shall first—by means of the adjusting screw 24—be set parallel to the plane formed by the axis of the objective 9 and the axis 22 of the measuring base body 8. The distance measuring staff set up perpendicularly on the gun barrel is then adjusted until the telescope 23 can be aimed at through the collimator 25 swivelling round the axis of the distance measuring staff 18 which is proof that the distance measuring staff is perpendicular to the plane 21.

In the course of this process care must simultaneously be taken, by actuating the wheeling in mechanism 6, to have accurate aim taken through the telescope 23 at the collimator 25, thus securing that the axis of the objective 9 coincides exactly with the plane 21 in which lies the projectile trajectory 20. Following on these preliminary adjustments, in order to carry out the distance measuring operation proper, the telescope 23, by means of the adjusting screw 24, is made to rotate round an axis 26 parallel to the axis 22 of the measuring base body into the position indicated by dash outlines—in which position aim is taken at a mark situated at the upper end of the distance measuring rule. In order to enable these aims to be taken through the telescope 23 in any case, the telescope is arranged swivelling round the axis 27 which is perpendicular to the axis 26. Out of the value, read on a scale, of the angle formed by the rays 28 and the known length of the stretch delimited on the distance measuring staff 18 by these two rays it is easy to ascertain the distance of the registering apparatus from the projectile trajectory.

After these adjustments have been completed the course of the optical path of rays is as follows:

The slit 16 arranged in front of the combined photo-electric cell and electronic multiplier 30 is depicted at two spots 29 of the trajectory over mirror 15, the objective consisting of mirror 14 and lens system 13, over cross mirrors 12, pentagonal mirrors 10 and 11. The fine adjustment, i. e. the sharp focussing of the slit images in the trajectory is effected by displacing the measuring slit 16. This displacement is preferably to be measured by means of a scale, so that once the distance of the trajectory from the measuring base body has been ascertained by means of the distance measuring appliance 17 the slit can be set accordingly.

In this way, through the cross mirrors 12, it is made possible to control two spots of the trajectory with one single photo-electric cell and one amplifier channel.

The passage of the projectile through the measuring spots 29 results, in the combined photo-electric cell and electronic multiplier 30, in modifications of the current the time interval of which shall now be measured. The electronic multiplier 30 is contained in the casing 31 in which is further located an input-amplifier consisting of the two amplifier tubes 32 and 33 with corresponding switch elements, and designed to bring about the first amplification of the signal supplied by the electronic multiplier. The voltages and currents required for the working of the electronic multiplier and of the amplifier are supplied over the lines 35, 36, 37 and 38; on the other hand, the amplified signal is led over the line 39 to the measuring appliance, to be further amplified and worked out. The line 35 is specially intended for feeding the magnet coil 40 of the electronic multiplier 30. Line 36 is connected with the earth (earthing connection). The anodic tension of the input amplifier is supplied over the line 37, whilst the line 38 is connected with the voltage divider 41 with which are connected the various electrodes of the electronic multiplier 30.

The cable 34 leads to the measuring appliance schematically represented in Fig. 5 which may conveniently be placed in a two-wheeled trailer. The appliance includes a power supply transformer 42 for connection for the power net, for converting the various power voltages into the feeding voltage of the appliance; the transformer is connected with the switch 43. With a view, however, to enable the appliance to work independently from any available power voltages the bottom part of the trailer includes a continuous current generator 45 driven by a benzine engine 44. This continuous current generator drives a continuous current motor 46 coupled with an alternating current generator 47 leading the feed voltage to the two-way switch 43. By reversing the two-way switch 43 the power feed may be supplied at will either by the transformer connected to the network or by the own generating plant.

The insertion of the motor converter group 46, 47 between the benzine engine group 44, 45 and the feed line 48 is intended to compensate the effect on the feed voltage of the unavoidable considerable fluctuations in the number of revolutions of the benzine engine. The motor 46 of the converter group is equipped for this purpose with a centrifugal governor whose contact 49, by short-circuiting the resistance 51 connected in series with the exciting winding 50, influences the excitation of the motor 46 in such a manner that the number of revolutions of the motor remains practically constant. The exciting windings of the generators 45 and 47 are designated with 52 and 53. The regulating resistances 54 serve to regulate the tensions.

The other parts of the measuring appliance serve to amplify further the signal supplied by the input amplifier over cable 34. Cable 34 first gets to the cable sheave 55, and from here to the entrance to an amplifier and regulating connection consisting of the tubes 56—64. At the cable outlet the various lines are designated by the same figures as at the cable inlet of the input amplifier. Line 38 leads to the low voltage supply device 65, line 37 to the anode voltage supply device 66 which also supplies the anode potential for all other tubular connections of the registering apparatus. With the assistance of the regulating resistance 67 the exciting current of the electronic multiplier flowing over line 35 can be regulated.

The connection consisting of the amplifying tubes 56—64 now works out—in a manner to be more fully described below—the signals supplied by the input amplifier. The uppermost curve of Fig. 4 represents the time course of these signals. At the moment of the passage of the projectile through the two measuring points the light falling on the multiplier undergoes each time a certain weakening, thus bringing about a potential course corresponding to this curve. In order to secure full accuracy in time measuring, two exactly defined points of this course of the curve must be considered; the most suitable way to do this is to utilize for this purpose the two flanks of the signal accounted for by the projectile base and rising almost vertically; it is, however, necessary to take special measures in order to make these two flanks stand out prominently in the time course of the signal. In our case this is effected by a time differentiation of the signal, which differentiation is brought about by electric means, the result being that out of the original signal is evolved the potential course according to the middle curve of Fig. 4 showing to potential peaks.

Finally, in order to measure accurately the time interval between the two potential peaks, these potential impulses are converted by means of a tipping amplifier into two rectangular potential impulses of equal duration and size, as shown by the bottom curve of Fig. 4. According to Fig. 5 the signal is first amplified further by means of the amplifier tube 56, after which the above mentioned differentiation of the signal is effected in the usual manner by means of the suitably sized condenser 68 and resistance 69. The amplifier tubes 57, 58, 59, together with the corresponding switching elements constitute a tipping amplifier of known design for carrying out the conversion into the rectangular signals of the potential peaks resulting from the differentiation.

The measure of the time interval between the two potential impulses is effected in the measuring appliance by means of two cathode ray tubes, the cathode rays of which are led on a circular path over the fluorescent screen with quite definite frequencies, and which are blocked in their normal state. If now the two rectangular potential impulses reach over line 70 the control electrodes 71 of the cathode ray tubes 72, two luminous circular traces will appear on the fluorescent screens of these two tubes. Out of the angle between these luminous traces can be determined the time interval if the deflecting velocity of the cathode rays is known. It has been found convenient to use two cathode ray tubes in view of the fact that in order to secure a high reading accuracy the rotating speed of the cathode ray must be so high that, in the interval between the two impulses, the cathode ray shall describe an angle which is a multiple of the full angle of 360°. Since, in this case, the number of the full turns of the cathode ray is indefinite, the cathode ray on the second cathode ray tube is made to rotate at a lower speed. The angle read on the second tube is then used to determine with accuracy the number of rotations of the cathode ray of the first cathode ray tube. In the case of Fig. 5 the cathode ray of the lower cathode ray tube rotates at high speed.

The circular deflection of the cathode ray is effected by known means, by applying at the pairs of deflecting plates 73, 74 sinusoidal deflecting potentials displaced in phase by 90°. The deflecting potential for the plate pair 73 is supplied by the oscillatory circuit 75, 76, whilst the deflecting potential, displaced in phase, of the plate pair 74 is supplied by the phase displacement junction 77 in connection with the same oscillatory circuit. In order to secure the exact circular shape when deflecting the cathode rays, the deflecting potential of the plate pair 73 can be set to the correct value by means of the potentiometer 78. The other parts of the cathode ray tubes, including the cathodes 79, anodes 80 and auxiliary electrodes 81, 82 together with the corresponding, partly adjustable switching elements 83 and voltage supply device 84, are generally known. The cathode ray tubes are further provided with a after acceleration electrode 85 which, as is known, is intended for further speeding-up of the cathode ray, in order that the luminous spot on the fluorescent screen may flash up more brightly. Since the deflection amplitude of the cathode ray is dependent on the extent of the after acceleration potential, this fact is utilized in our case to enable the first light impulse to be distinguished from the second.

In the time interval between the two impulses the after acceleration voltage is reduced by means of the amplifier tube 86 so that the second light impulse is caused to fall on another diameter and can be easily distinguished from the first, thus enabling the angle between the two impulses to be unobjectionably determined. Before a fuller explanation of this potential lowering can be given it is necessary to explain the function of the relay 87 actuated by the tipping device 63, 64. This relay serves to interrupt the line 70, shortly after the two potential impulses shall have reached the cathode ray tubes over this line, since otherwise, as a result of the shock inflicted on the amplifiers by the muzzle blast of the gun, further undesirable potential impulses would make themselves felt on the control grids of the cathode ray tubes. The tipping device 63, 64 is connected with the line 70, and acts as soon as the first potential impulse appears on this line. The relay 87, however, functions under the action of the condensers 88 as a slow-release relay, so that the contact 89 of the relay is only opened after the passage of the second impulse. The time characteristic of the tipping device 63, 64 to tip over immediately upon the first potential impulse, is used for lowering the after acceleration voltage of the cathode ray tubes in the time interval between the two impulses. For this purpose, the tipping device 63, 64 is switched over the line 90 on the grid of the amplifier tube 86, whilst the anode of this amplifier tube is connected with the after acceleration electrodes 85. The after acceleration electrodes are put under tension by the voltage supply device 91. As a result of the sudden positive and lasting rise in voltage taking place as soon as the first impulse appears at the grid of the amplifier tube 86, and of the subsequent anode current impulse there takes place at the resistance 92 a drop in voltage which is transmitted to the after acceleration electrodes.

In order to complete the explanation relating to the mode of working of the cathode ray tubes further information shall be given as to the method of feeding the oscillatory circuits 75, 76. These oscillatory circuits are each directly connected with the push-pull amplifier tubes 93, 94, which in their turn, are controlled by a quartz oscillator and frequency subdividing device including the amplifier tubes 95, 96, 97 and 98. The use of such a network ensures that the deflecting frequencies always retain a value determined with the utmost accuracy. The oscillator tube 95 is controlled by the quartz oscillator 99 oscillating with the frequency of 100,000 C. P. S. whilst the amplifier tube 96 separates the oscillator part from the frequency subdivision device 97, 98. The subdivision of the oscillator frequency is effected according to known methods, in the relation 100,000:10,000:1,000. The amplifier tube 97 thus gives out to the lower cathode ray tube the frequency 10,000 C. P. S., whilst the upper cathode ray tube receives from the amplifier tube 98 the frequency 1,000 C. P. S. The choice of a decimal relation between the two deflecting frequencies for the cathode rays facilitates the working out of the measurement result which has to be recorded by photographing the fluorescent screens of the two cathode ray tubes.

Finally, the purpose and the working of the network consisting of the tubes 60—62 shall be explained. This is an automatic peak of noise control, somewhat similar to the devices used in wireless receiving sets for automatic volume control. Its purpose is to set automatically the grid initial voltage of the tube 58 to such a value that in a state of rest the tipping amplifier consisting of the tubes 57, 58 and 59 is just on the brink of tipping over, without actually doing so. It is a known fact that the voltage supplied by a photoelectric cell or by an electronic multiplier, in the case of subsequent considerable amplification, is subjected to greater or less fluctuations changing in rapid succession (noise voltage). This noise voltage depends on the intensity of the light falling on the photo-cathode of the electronic multiplier. In the appliance described above the case is conceivable that the signals generated by the projectile do not exceed by much the peak values of the noise voltage. In such a case, the initial negative grid voltage of the tube 58 has to be set very closely and must be constantly re-adjusted to fit any changes in light intensity, which can only be secured by the use of the automatic peak of noise control. In the case of Fig. 5, again, this control consists of a tipping device 60, 61, 62. The grid of the control tube 60 is in this case connected with the grid of the tube 58 for alternating current, so that the peaks of the noise voltage also reach the grid of the tube 60. Under the action of these peaks of the noise voltage the tipping device 60, 61, 62 should be constantly caused to tip over at an irregular rhythm, in the course of which process the resulting anode current impulses of the tube 62 are rectified by means of the rectifier 100 and the condenser 101 is negatively charged. The potential of the condenser 101 is filtered and transmitted to the condenser 102, and the line 103 leads from here, over the resistance 104, to the grid of the tube 60. In this way the tube 60 receives such an initial negative grid voltage that only the highest peaks of noise voltage—of rare occurrence—cause the tipping device to tip over, to an extent just sufficient to keep up the negative potential of the condenser 102. Now, the tube 58 as well receives its grid voltage from the condenser 102 over the resistance 105, with the insertion, however, of a potentiometer 107 fed from the battery 106, which potentiometer makes it possible to set this negative grid voltage 1-2 volt below the critical limit. Consequently, in a state of rest, these peaks of the noise voltage will not cause the tipping amplifier 57, 58, 59 to tip over, whilst the effect of the signals generated by the projectile is not impaired. Through the automatic peak of noise control described above the grid voltage of the tube 58 is automatically lowered when the noise voltage increases, and vice versa. Of course, the value adopted for the inertia of the peak of noise control is sufficient to ensure that no change worth mentioning shall take place in the grid voltage within the time interval between the two impulses brought about by the projectile.

We claim:

1. In an installation for measuring projectile velocities, in combination, a registering apparatus adjustable parallel to a projectile trajectory and comprising a combined photo-electric cell and electronic multiplier, an electronic preamplifier connected with said cell, means constituting a slit located in front of said photoelectric cell, and means comprising an optical set and systems of mirrors for depicting said slit in two points of said projectile trajectory lying at a predetermined distance from each other, a cable connected to the output of said preamplifier, a measuring apparatus comprising at least two cathode ray tubes, and means connected with said cathode ray tubes and said cable for making visible the time interval between the impulses generated by the passage of the projectile through the slit images.

2. In an installation for measuring projectile velocities, a registering apparatus for the transmission of impulses to a measuring apparatus, said registering apparatus comprising a combined photo-electric cell and electronic multiplier, an electronic preamplifier connected with said photo-electric cell and electronic multiplier, means constituting a slit located in front of said photo-electric cell, an optical set and systems of mirrors, and separate means for causing said photo-electric cell and electronic multiplier, said preamplifier, the first-mentioned means and said optical set and systems of mirrors to carry out as a unit, a turning movement, an elevational movement and a wheeling in movement for adjusting the registering apparatus parallel to a projectile trajectory and causing said slit to be depicted in two points of said projectile trajectory lying at a predetermined distance from each other.

3. In an installation for measuring projectile velocities, a registering apparatus for the transmission of impulses to a measuring apparatus, said registering apparatus comprising a photoelectric cell and electronic multiplier, an electronic preamplifier connected with said photoelectric cell and electronic multiplier, means constituting a slit located in front of said photoelectric cell, cross mirrors and pentagonal mirrors, and separate means for causing said photoelectric cell and electronic multiplier, said preamplifier, the first-mentioned means and said mirrors to carry out as a unit, a turning movement, an elevational movement and a wheeling in movement for adjusting the registering apparatus parallel to a projectile trajectory and causing said slit to be depicted in two points of said projectile trajectory lying at a predetermined distance from each other.

4. An installation in accordance with claim 1, wherein said measuring apparatus comprises a power supply transformer, a power plant for generating alternating voltages, and a switch connecting said transformer and said power plant with the means which make the time interval visible.

5. An installation in accordance with claim 1, wherein the means of the measuring apparatus which make the interval visible includes devices generating high and low voltages required for measuring purposes.

6. An installation in accordance with claim 1, wherein the means of the measuring apparatus which make the time interval visible include an impulse amplifier and a tipping device connected therewith.

7. An installation in accordance with claim 1, wherein the means of the measuring apparatus which make the time interval visible include an impulse amplifier having a network for differentiating the impulses.

8. An installation in accordance with claim 1, wherein the means of the measuring apparatus which make the time interval visible include a quartz oscillator connected with the cathode ray tubes for controlling them.

9. An installation in accordance with claim 1, wherein the means of the measuring apparatus which make the time interval visible include means connected with the cathode ray tubes for causing the cathode ray of the cathode ray tubes to follow a circular path.

10. An installation in accordance with claim 1, wherein the means of the measuring apparatus which make the time interval visible include means connected with the cathode ray tubes for working them with different frequencies standing in decimal relation.

11. An installation in accordance with claim 1, wherein the cathode ray tubes comprise an after-acceleration electrode.

12. An installation in accordance with claim 1, wherein the means of the measuring apparatus which make the time interval visible include a switching-off device and means connected therewith for controlling it by the first impulse.

13. An installation in accordance with claim 1, wherein the cathode ray tubes comprise an after-acceleration electrode, and wherein the means of the measuring apparatus which make the time interval visible include means applying at said after-accelerating electrodes potentials which differ for both tubes between the two impulses, the change occurring immediately after the reception of the first impulse.

14. An installation in accordance with claim 1, wherein the means of the measuring apparatus which make the time interval visible include means for an automatic peak of noise control to act upon the peaks of the noise voltage.

FRIEDRICH FISCHER.
WERNER AMREIN.